UNITED STATES PATENT OFFICE.

BRUNO BECKMANN, OF BERLIN, GERMANY.

PROCESS OF MANUFACTURING THE CARBAMIC-ACID ESTER OF DICHLORHYDRIN.

1,108,676.     Specification of Letters Patent.     Patented Aug. 25, 1914.

No Drawing.     Application filed November 22, 1913. Serial No. 802,537.

*To all whom it may concern:*

Be it known that I, Dr. BRUNO BECKMANN, a subject of the German Emperor, and residing at Belle-Alliance strasse 92, Berlin, Germany, have invented certain new and useful Improvements in Processes of Manufacturing the Carbamic-Acid Ester of Dichlorhydrin, of which the following is a specification.

This invention relates to a process of manufacturing the carbamic acid ester of dichlorhydrin which consists in causing chlorid of carbamic acid to act on α-dichlorhydrin. For example, 4 kg. carbamic acid chlorid are slowly poured into 6.5 kg. α-dichlorhydrin while vigorously stirring and cooling the same. Carbamate of dichlorhydrin is precipitated as a white solid substance. After sucking away the excess of dichlorhydrin, washing with water and recrystallization, the carbamic acid ester of dichlorhydrin forms colorless needles having a melting point of 82°–83° C.

The reaction takes place according to the following formula:

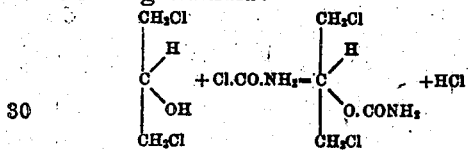

It is true that Otto has published in the "*Jahrbuch für Praktische Medizin*", 1891, a synthesis of the ester of dichlorisopropyl-carbamic acid which, however, occupies so much time and is so expensive that it cannot come into question as a commercial process. In addition, the product obtained according to Otto's synthesis differs in many respects from that made according to the hereindescribed process. Thus Otto's product differs from that made by the new process in physical respects. Otto's product melts at 80° C., and that according to the new process at 82°–83° C. Further, Otto's product is tasteless, whereas that of the hereindescribed process has a bitter taste. Also, as regards solubility in water, the two products behave differently. 1 part of Otto's product dissolves in 65 parts of water, whereas 1 part of the product according to the hereindescribed process dissolves in 78 parts of water. Moreover, the physiological action of the two products is different, the narcotic action of the product obtained by the new process being considerably superior to that of Otto's product; comparative tests which have been made prove that the narcotic actions of the products are approximately as 3:1, which shows the excellent therapeutic property of the product made by the hereindescribed process.

What I claim is:

The hereindescribed process of manufacturing carbamic acid ester of α-dichlorhydrin, consisting in subjecting α-dichlorhydrin to the action of carbamic acid chlorid.

In testimony whereof I affix my signature in presence of two witnesses.

Dr. BRUNO BECKMANN.

Witnesses:
WOLDEMAR HAUPT,
HENRY HASPER.